(12) United States Patent
Vockler et al.

(10) Patent No.: US 7,838,116 B2
(45) Date of Patent: Nov. 23, 2010

(54) SILICONE-COATED ARCHITECTURAL AND DECORATIVE GLASS

(75) Inventors: Larry Vockler, Vancouver, WA (US); Marafur Rahim, Vancouver, WA (US); Abram Scurlock, Vancouver, WA (US)

(73) Assignee: Industrial Control Development, Inc., Vancouver, WA (US)

( * ) Notice: Subject to any disclaimer, the term of this patent is extended or adjusted under 35 U.S.C. 154(b) by 112 days.

(21) Appl. No.: 12/384,737

(22) Filed: Apr. 8, 2009

(65) Prior Publication Data

US 2009/0202842 A1      Aug. 13, 2009

Related U.S. Application Data

(63) Continuation-in-part of application No. 11/449,466, filed on Jun. 8, 2006, now Pat. No. 7,531,242, which is a continuation-in-part of application No. 11/241,191, filed on Sep. 30, 2005, now Pat. No. 7,309,734.

(51) Int. Cl.
*B32B 9/04*      (2006.01)
*C08L 83/04*    (2006.01)

(52) U.S. Cl. .................. 428/429; 428/428; 428/447; 525/477; 525/478; 525/479; 524/424; 524/430; 528/15; 528/31; 528/32

(58) Field of Classification Search .................. None
See application file for complete search history.

(56) References Cited

U.S. PATENT DOCUMENTS

| 3,889,023 | A | | 6/1975 | Plueddemann | |
|---|---|---|---|---|---|
| 4,115,356 | A | | 9/1978 | Hilliard | |
| 4,163,081 | A | | 7/1979 | Schulz | |
| 4,495,340 | A | | 1/1985 | Blizzard et al. | |
| 4,814,230 | A | | 3/1989 | Vockler et al. | |
| 4,946,893 | A | * | 8/1990 | Saito et al. | 524/862 |
| 5,364,921 | A | | 11/1994 | Gray et al. | |
| 5,521,245 | A | * | 5/1996 | Hirabayashi et al. | 524/493 |
| 6,017,587 | A | * | 1/2000 | Kleyer et al. | 427/387 |
| 6,750,273 | B2 | * | 6/2004 | Chao | 523/212 |
| 6,838,499 | B2 | * | 1/2005 | Kimura | 524/268 |

* cited by examiner

*Primary Examiner*—Marc S Zimmer
(74) *Attorney, Agent, or Firm*—Chernoff, Vilhauer, McClung & Stenzel

(57) ABSTRACT

An extremely durable, stable and fast-curing elastomeric composition suitable for coating all types of architectural and decorative glass is disclosed.

22 Claims, No Drawings

SILICONE-COATED ARCHITECTURAL AND DECORATIVE GLASS

CROSS-REFERENCE TO RELATED APPLICATIONS

This is a continuation-in-part of Ser. No. 11/449,466 filed Jun. 8, 2006 now U.S. Pat. No. 7,531,242, which is a continuation-in-part of Ser. No. 11/241,191 filed Sep. 30, 2005, now U.S. Pat. No. 7,309,734, the priority of both of which is claimed pursuant to 35 USC 120.

BACKGROUND OF THE INVENTION

In recent years there has been increasing use of coated glass in the construction industry, especially in spandrel and interior design applications, since such glass is substantially less expensive than conventional exterior materials such as brick and granite and presents aesthetically appealing design choices for both exteriors and interiors. Typically such glass is secured to building structures by adhesive sealants applied to the coated side of the glass; because of this, the integrity and durability of the bond between the coating and the adhesive sealant is of critical importance. Metallic coatings have been applied by low temperature vacuum deposition and by high temperature pyrolitic methods in order to enhance both the aesthetic appeal and reflective character of such glass, the latter conserving energy in air-conditioned buildings. Ceramic frit coatings or so-called "ceramic enamels" have been used to color and to opacify pyrolitic metal-coated glass. However, ceramic frit coatings may not be used to coat glass that has been metal-coated by vacuum deposition because the approximately 1400° C. temperature required to apply the coatings distorts and melts the vacuum deposition metallic coating. Another drawback of the high temperature firing required to apply ceramic frit coatings is that it severely limits the number of color choices.

One recent attempt to overcome the problem of attempting to apply a ceramic frit coating over a vacuum-deposition metallic coating has been the development of a so-called "post-temperable" metallic-coated glass. This type of glass is prepared by applying an intermediate silicon layer over the metallic coating, curing the intermediate layer, then depositing the so-coated glass substrate in a tempering oven, whereupon the ceramic frit coating is then applied at an elevated temperature. The principal drawback of this procedure is that the temperature range that may be used to successfully apply the ceramic frit coating is very narrow.

The use of curable elastomeric silicone compositions for coating substrates such as steel and glass is known. See, for example, U.S. Pat. Nos. 3,889,023, 4,115,356, 4,163,081, 4,495,340 and 5,364,921. The use of such compositions for coating and reinforcement of architectural spandrel-type glass is also known. See commonly owned U.S. Pat. No. 4,814,230. There are a number of drawbacks of currently available elastomeric coatings for glass: they often are applied with solvents, thereby complicating application and lengthening curing times; many contain volatile organic compounds (VOCs), requiring measures to protect both workers and the environment; many are chemically unstable at higher temperatures; they usually have a relatively short shelf life; and, perhaps most importantly, they have insufficient adherence to meet four-sided structural glazing specifications.

There is therefore a need in the industry for a glass coating that enhances the tensile strength of all types of construction or architectural grade glass, that can render the same opaque and impart a large spectrum of colors thereto, that has a very rapid curing time, that has no VOCs and a 100% solids content, that can withstand the elements, that is chemically stable at higher temperatures, that has a long shelf life, that bonds to either glass substrates or to the metallic-coated side of glass substrates sufficiently to meet four-sided structural glazing specifications, that may be applied and cured at relatively cool temperatures so as not to distort or melt the metallic coating on glass, and that forms a durable bond with adhesive sealants commonly used in the construction industry to secure glass panels to building structures. There is also a demand in the appliance and interior design trades for color-coated decorative glass-covered doors and trim pieces wherein the color coatings are durable, scratch-resistant and contain no VOCs. These needs are met by the present invention, which is summarized and described in detail below.

BRIEF SUMMARY OF THE INVENTION

There are several aspects to the present invention. In a first aspect, the invention provides a 100% solids-containing flowable elastomeric composition for coating glass used both in building construction applications and decorative glass applications.

In a second aspect, the invention provides novel composite articles comprising a glass substrate coated with the aforementioned elastomeric composition.

In a third aspect, the invention provides a novel composite article comprising a metal-coated glass substrate wherein the metallic coating may be coated with the aforementioned elastomeric composition, regardless of whether the metallic coating has been applied by a high temperature pyrolitic method or a low temperature vacuum deposition method.

When stored under normal ambient conditions, the composition exhibits a shelf life of up to a year. Once the composition is applied, the resulting coating is chemically stable up to 260° C., and easily passes all known tests for UV-resistance, humidity-resistance and adhesion, and that bonds sufficiently to architectural glass to permit the coated glass to meet four-sided structural glazing specifications. The composition is non-flammable, solventless, contains no VOCs, making it environmentally safe, is roll-coatable at relatively low temperatures, may be left on coating equipment for extended periods without cleaning and, due to its relatively low temperature application and cure, may be used with virtually any pigment without altering the pigment, thus making it available in a wide variety of colors.

DETAILED DESCRIPTION OF PREFERRED EMBODIMENTS

As used in the specification and claims, the term "about" means the stated value±10% of that value, and the phrase "approximate weight percentages" means the wt % noted±1 wt % when referring to whole numbers and the wt % noted±0.1 wt % when referring to decimals. For example, reference to 50 wt % preceded by "approximate weight percentage" means 50 wt %±1 wt %, or 49-51 wt %, while reference to 0.3 wt % preceded by the same phrase means 0.3 wt %±0.1 wt %, or 0.2-0.4 wt %.

The Substrate

The coating composition of the invention may be applied to virtually any glass substrate, coated or uncoated. As mentioned above, in commercial building and architectural spandrel applications, there are commonly encountered vacuum-deposited and pyrolitically formed reflective metal-coated plate glass; these two types are also suitable substrates for the coating composition of the invention. In addition, the coating composition may be applied to non-architectural, lighter gauge decorative glass such as glass-clad appliance doors, mirrors, etc.

The Coating Composition

The coating composition of the invention comprises a crosslinked polyvinylsiloxane/liquid silicone rubber (PVS/LSR) component modified by up to five other components.

The PVS/LSR component is commercially available from Dow Corning® as CF-7500 which, when combined with the other components and heated, forms a crosslinked polysiloxane. It is preferably present from about 50 to about 70 wt % of the inventive composition based upon the entire weight of all components in the composition of the invention, which is the convention used for all references to wt % in this specification and in the claims. The Dow Corning® PVS/LSR CF-7500 composition consists of the following four components: (1) dimethylvinyl-terminated dimethylsiloxane; (2) dimethylvinylated, trimethylated silica; (3) dimethylvinyl-terminated dimethyl, methylvinyl siloxane and (4) dimethyl, methylhydrogen siloxane.

A second component of the composition that crosslinks with the PVS/LSR composition is hydrogen-terminated siloxane, or silicone hydride, commercially available as Syl-Off 7682 from Dow Corning of Midland, Mich. The silicone hydride is preferably present from about 4 to about 15 wt % broadly and from about 4 to about 10 wt % in decorative glass applications and from 10 to about 15 wt % in Spandrel glass applications.

A third component of the composition that also crosslinks with the PVS/LSR composition is vinyl-terminated dimethylsiloxane, preferably present from about 20 to about 45 wt %, and commercially available as DMS-V22 from Gelest, Inc. of Morrisville, Pa. For Spandrel applications, such a component is preferably present from about 20 to about 35 wt %, while for decorative glass applications, the preferred range is from about 27 to 40 wt %.

A fourth component of the composition is silica, present from 0 to 15 wt %. For Spandrel applications, the preferred range is from about 5 to about 15 wt %, while for decorative glass, preferably no silica is present.

Viscosity of the composition may range widely, depending upon the speed and thickness of application, from about 15,000 to about 135,000 Centipoise (cp). For Spandrel applications, viscosity is preferably from about 15,000 to about 25,000 cp, while for decorative glass applications, viscosity is preferably from about 20,000 to about 35,000 cp. For Spandrel applications, the coating thickness is preferably 3 to 10 mils, more preferably 4 to 6 mils; while for decorative glass it is preferably 0.5 to 3 mils, more preferably 1 to 2 mils.

Finally, the composition may contain pigment, which may be present in an amount of from about 1 to about 15 wt %. For Spandrel applications, the range is from about 1 to about 10 wt %, preferably from about 1 to about 5 wt %, while for decorative glass, from about 1 to about 15 wt %, preferably from about 4 to about 14.5 wt %. The pigment may be of any type or in any form that is compatible with the composition and is capable of rendering the same colored or substantially opaque. Preferred examples are inorganic pigments such as iron oxides, titanium dioxide, zinc oxide, mixed metal oxides and treated micas; organic colors such as sulfur-free carbon black; and mixtures thereof, ail in dry or powdered form.

To promote crosslinking, a metal complex catalyst is present, wherein the metal is selected from Platinum (Pt), Ruthenium (Ru), Rhodium (Rh) and Iridium (Ir). The preferred catalyst is a Rhodium complex. A preferred form of the Rh catalyst is a trichlorotris (dibutylsulfide) Rhodium complex containing from about 2.9 to about 3.3 wt % Rh. When used in this form, the preferred amount of the complex in the overall composition is from about 0.0015 to about 0.30 wt %. For both Spandrel and decorative glass applications the preferred range is from about 0.006 to about 0.15 wt %.

In summary, prior to application, the elastomeric composition of the invention comprises the following components in the approximate weight percentages noted:
(a) 50-70 wt % of a crosslinked polyvinylsiloxane/liquid silicone rubber component which, prior to crosslinking, contains the following components: dimethylvinyl-terminated dimethylsiloxane; dimethylvinylated, trimethylated silica; dimethyl-terminated dimethyl, methylvinyl siloxane; and dimethyl, methylhydrogen siloxane;
(b) 4-15 wt % of a hydrogen-terminated siloxane;
(c) 20-45 wt % vinyl-terminated dimethylsiloxane;
(d) 0-15 wt % silica;
(e) 1-15 wt % pigment; and
(f) a metal complex catalyst wherein the metal is selected from the group consisting of Platinum, Ruthenium, Rhodium and Iridium.

Application of the Coating

The composition is preferably applied to the glass substrate by conventional roller coating. The coating should be applied to Spandrel glass in a film averaging from about 3 to about 10 mils in thickness, preferably 4 to 6 mils, and to decorative glass from about 0.5 to about 3 mils, preferably 1 to 2 mils.

Curing of the composition may be effected by air, by heat or by infrared (IR) radiation. Of these, an IR radiation cure at 145°-200° C. at ambient relative humidity is preferred, more preferably at about 145°-180° C., whereby the cure is generally substantially complete within 2 to 6 minutes, depending upon coating thickness, glass thickness, pigment chosen and ambient temperature. The coated glass product is generally sufficiently cool to permit shipping and handling within several minutes.

Example 1

A substrate of architectural grade Spandrel-type glass was washed with hot water and detergent and allowed to dry. A pigment dispersion was prepared by adding 3.96 kg of vinyl-terminated dimethylsiloxane to a blending vessel equipped with a high shear vertical mixer, to which 1.76 kg of $TiO_2$ pigment was added; mixing took place until large agglomerates of the pigment were broken up. This mixture was transferred to a horizontal mill and milled to a fineness gage of $\geq 6.5$ Hegman. This milled blend of vinyl-terminated dimethylsiloxane and pigment was transferred back to a high shear vertical mixer vessel and 1.3 kg of silica and another 2.2 kg of vinyl-terminated dimethylsiloxane was added and blended in, followed by filtration through a 50 micron filter.

In a separate mixing vessel, 11.4 kg of Dow Corning PVS/LSR CF-7500 Part B were mixed with 1.1 kg of hydrogen-terminated siloxane, then the pigment dispersion noted above was added together with 500 ppm of a Rhodium complex of trichlorotris(dibutylsulfide)Rh and all components were mixed with a gyroscopic mixer until a homogeneous composition was obtained.

The makeup of the so-prepared composition on a wt % basis was 52 wt % CF-7500 Part B; 5 wt % hydrogen-terminated siloxane; 28 wt % vinyl-terminated dimethylsiloxane; 6 wt % silica; 8 wt % pigment; and 1 wt % Rh complex catalyst.

The resulting composition was applied in a substantially uniform coating averaging 5 mils in thickness to the glass substrate by a Model 609RS roll coater system from The Wallace Company of Monrovia, Calif. and crosslinked/cured at 168° C. for 4 minutes in an IR oven at ambient relative humidity. After cooling for 5 minutes under a fan, the coating on the substrate was tested for adherence in accordance with ASTM D475 using methylethylketone swabs, and showed no removal of coating.

Various common sealants/adhesives used in the construction industry were applied to the coated side of the substrate for four-sided testing of the adequacy of sealant, adhesion to the coating, with the sealant being applied by a modified ASTM C794-80 protocol. The dry peel test was conducted in accordance with ASTM C-794. The soak and peel and soak and structural pull tests were performed after immersing the coated substrate in 63° C. water for 14 days. The soak test was performed after immersing the coated substrate in 100° C. water for 10 days. The structural dry pull test was conducted in accordance with ASTM C-719. Finally, the coated substrate was exposed to 5000 hours of accelerated aging in a QUV weatherometer in accordance with ASTM C-719, followed by exposure to direct UV light for 240 hours at 60° C. The results of all of the tests are set out in Table 1.

was no loss of adhesion of the coating, no blistering and no visible changes in the coating after either test.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

The invention claimed is:

1. An elastomeric composition for coating a substrate selected from the group consisting of glass and metallic-coated glass comprising the following components in the following approximate weight percentages:
   (a) 50-70 wt % of a crosslinked polyvinylsiloxane/liquid silicone rubber component which, prior to crosslinking, contains the following components: dimethylvinyl-terminated dimethylsiloxane; dimethylvinylated, trimethylated silica; dimethyl-terminated dimethyl, methylvinyl siloxane; dimethyl, methylhydrogen siloxane;
   (b) 4-15 wt % of hydrogen-terminated siloxane;
   (c) 20-45 wt % vinyl-terminated dimethylsiloxane;
   (d) 0-15 wt % silica;
   (e) 1-15 wt % pigment; and

TABLE 1

| Type Sealant/Adhesive | Dry Peel ($\geq$20 pli)** | Dry Pull ($\geq$60 psi)* | 14 day Soak & Peel ($\geq$20 pli)** | 14 day Soak & Pull ($\geq$60 psi)* | 10 day Boil Soak$^v$ | 5000 hrs QUV$^v$ ($\geq$20 pli)** | 240 hrs UV$^v$ |
|---|---|---|---|---|---|---|---|
| Dow 995 | cfs @ 60 pli | cfs @ 160 psi | cfs @ 55 pli | cfs @ 160 psi | no blisters or defects | cfs @ 55 pli no blisters or defects | no blisters or defects |
| Dow 795 | cfs @ 31 pli | cfs @ 110 psi | cfs @ 25 pli | cfs @ 160 psi | no blisters or defects | no blisters or defects | no blisters or defects |
| Dow 938 | cfs @ 40 pli | cfs @ 148 psi | cfs @ 50 pli | cfs @ 39 psi | no blisters or defects | cfs @ 148 pli no blisters or defects | no blisters or defects |
| GE 4400 2K | cfs @ 20 pli | cfs @ 96 psi | cfs @ 33 pli | cfs @ 143 psi | no blisters or defects | no blisters or defects | no blisters or defects |
| GE Silpruf 2000 | cfs @ 49 pli | cfs @ 115 psi | cfs @ 52 pli | cfs @ 71 psi | no blisters or defects | no blisters or defects | no blisters or defects |

*psi numbers in parens = acceptable pressure at which pulls conducted before cohesive failure of sealant
**pli numbers in parents = acceptable pressure per lineal inch at which peels conducted before cohesive failure of sealant
cfs = cohesive failure of sealant indicated by sealant itself tearing
$^v$ = visual test Example 2

Substantially the same procedure was followed as in Example 1 except that the substrate was 5-mm thick glass suitable for decorative glass applications, the coating was applied with a Model AT-45P screen printer from ATMA Champ Enterprise Corp. of Livermore, Calif., and the following wt % of the same components were used to form the coating composition:
   28.5 wt % vinyl-terminated dimethylsiloxane;
   14.5 wt % TiO$_2$ pigment;
   4.0 wt % hydrogen-terminated dimethylsiloxane;
   52 wt % Dow Corning CF7500 Part B; and
   1 wt % (200 ppm) Rh complex catalyst.

Samples of the so-coated glass were tested by exposing the same to 5000 hours of QUV at 60% RH in accordance with ASTM C1442 and by immersion in 63° C. for 14 days. There (f) a metal complex catalyst wherein the metal is selected from the group consisting of platinum, ruthenium, rhodium and iridium.

2. The composition of claim 1 wherein component (e) is selected from the group consisting of sulfur-free carbon black, iron oxides, titanium dioxide, zinc oxide, mixed metal oxides, treated micas, inorganic and organic colors and mixtures thereof.

3. The composition of claim 1 wherein said catalyst in component (f) comprises a rhodium complex.

4. The composition of claim 3 wherein said rhodium complex comprises trichlorotris (dibutylsulfide) rhodium.

5. The composition of claim 4 wherein said rhodium complex is present from about 0.06 to about 0.30 wt %.

6. The composition of claim 1 or 4 wherein component (b) is present from about 4 to about 10 wt %, component (c) is present from about 27 to about 40 wt %, component (d) is not present, component (e) is present from about 4 to about 14.5 wt %, and component (f) is present from about 0.06 to about 0.15 wt %.

7. The composition of claim 6 wherein the viscosity of said composition is from about 25,000 to about 35,000 cps.

8. The composition of claim 1 or 4 wherein component (b) is present from about 10 to about 15 wt %, component (c) is present from about 20 to about 35 wt %, component (d) is present from about 4 to about 15 wt %, component (e) is present from about 1 to about 5 wt %, and component (f) is present from about 0.06 to about 0.15 wt %.

9. The composition of claim 8 wherein the viscosity of said composition is from about 15,000 to about 25,000 cps.

10. A composite article comprising a glass substrate coated with an elastomeric coating comprising the following components in the following approximate weight percentages:
   (a) 50-70 wt % of a crosslinked polyvinylsiloxane/liquid silicone rubber component which, prior to crosslinking, contains the following components: dimethylvinyl-terminated dimethylsiloxane; dimethylvinylated, trimethylated silica; dimethyl-terminated dimethyl, methylvinyl siloxane; dimethyl, methylhydrogen siloxane;
   (b) 4-15 wt % of hydrogen-terminated siloxane [7682];
   (c) 20-45 wt % vinyl-terminated dimethylsiloxane;
   (d) 0-15 wt % silica;
   (e) 1-15 wt % pigment; and
   (f) a metal complex catalyst wherein the metal is selected from the group consisting of platinum, ruthenium, rhodium and iridium.

11. The composite article of claim 10 wherein component (e) is selected from the group consisting of sulfur-free carbon black, iron oxides, titanium dioxide, zinc oxide, mixed metal oxides, treated micas, inorganic and organic colors and mixtures thereof.

12. The composite article of claim 10 wherein said catalyst in component (f) comprises a rhodium complex.

13. The composite article of claim 12 wherein said rhodium complex comprises trichlorotris (dibutylsulfide) rhodium.

14. The composite article of claim 13 wherein said rhodium complex is present from about 0.006 to about 0.30 wt %.

15. The composite article of claim 10 or 13 wherein said glass substrate is selected from the group consisting of float glass, sputter-coated glass and pyrollitic glass.

16. The composite article of claim 15 wherein said glass substrate has a metallic coating thereon which is coated with said elastomeric coating.

17. The composite article of claim 16 wherein said metallic coating has been applied by a high temperature pyrolitic method.

18. The composite article of claim 16 wherein said metallic coating has been applied by a low temperature vacuum deposition method.

19. The composite article of claim 10 or 13 wherein component (b) is present from about 4 to about 10 wt %, component (c) is present from about 27 to about 40 wt %, component (d) is not present, component (e) is present from about 4 to about 14.5 wt %, and component (f) is present from about 0.06 to about 0.15 wt %.

20. The composite article of claim 19 wherein the viscosity of said composition is from about 25,000 to about 35,000 cps.

21. The composite article of claim 10 or 13 wherein component (b) is present from about 10 to about 15 wt %, component (c) is present from about 20 to about 35 wt %, component (d) is present from about 4 to about 15 wt %, component (e) is present from about 1 to about 5 wt %, and component (f) is present from about 0.06 to about 0.15 wt %.

22. The composite article of claim 21 wherein the viscosity of said composition is from about 15,000 to about 25,000 cps.

* * * * *